March 3, 1970　　　J. SCHULZ　　　3,498,277
DEVICE FOR PREVENTING LIQUID FLOW IN A CLOSED BRANCH CIRCUIT
Filed July 1, 1968　　　3 Sheets-Sheet 1

INVENTOR.
JOACHIM SCHULZ
BY
ATTORNEYS

INVENTOR.
JOACHIM SCHULZ
ATTORNEYS

United States Patent Office 3,498,277
Patented Mar. 3, 1970

3,498,277
DEVICE FOR PREVENTING LIQUID FLOW IN A CLOSED BRANCH CIRCUIT
Joachim Schulz, Sudring, Mudau, Odenwald, Germany, assignor to Aurora-Fahrzeugheizungen, Konrad G. Schulz KG, Sudring, Mudau, Odenwald, Germany
Filed July 1, 1968, Ser. No. 741,417
Claims priority, application Germany, July 3, 1967, A 56,164
Int. Cl. F01p 7/16, 7/14, 7/00
U.S. Cl. 123—41.1                    10 Claims

ABSTRACT OF THE DISCLOSURE

A device for preventing coolant flow through the radiator of an internal combustion engine, when a thermostat controlling the radiator flow is closed, includes a floating body normally closing an opening in the lower tank of a radiator and displaced from closing position upon flow of coolant under pressure downwardly through the radiator. The device may be provided as original equipment or as a unit for installation in existing equipment.

BACKGROUND OF THE INVENTION

In coolant circuits, for internal combustion engines, of the type in which a short circuiting line is branched from the thermostat in parallel relation with the radiator, the thermostat is arranged downstream of the internal combustion engine and no shut-off elements are provided between the thermostat and the circulating pump which is located immediately before or actually in the engine. In another arrangement, the thermostat is arranged directly in advance of the pump in the coolant flow line leading back to the internal combustion engine or motor.

There are also known arrangements in which a partial flow of coolant is permitted through the radiator even when the thermostat is closed. However, these arrangements have the disadvantage that the radiator cannot be completely shut off and effectively blocked, which is necessary in rail vehicles and motor vehicles during starting, and particularly, in cold weather or in cold climates.

Additionally, in arrangements in which the radiator can be completely shut off when the thermostat is closed, a heat exchange takes place bketween the coolant in the radiator and the coolant flowing through the short circuiting line. This phenomenon can be accounted for by the fact that hot water is constantly fed to the pump through the short circuit line, while the line branching to the radiator contains very cold water. Since the two differently heated quantities of water are constantly in contact of each other during flow to the pump circulating line, a current is established in the radiator and in the radiator return line due to the thermosiphon effect. In the lower region of the radiator return line, cold water accumulates and flows toward the pump while, in the upper region of this line, hot water flows from the short circuit line to the radiator. The hot water rises in the radiator, cools off, and forces the cold water into the hot water circulation taking place through the short circuiting line.

This very disadvantageous effect produced under the above-mentioned conditions can be reduced to a certain extent by heat-insulating shutters or covers for the radiator. On the other hand, there are known anti-freezes for the cooling water which can keep the cooling water in liquid form down to −50 deg. C. or −58 deg. F.

SUMMARY OF THE INVENTION

This invention relates to thermostat-controlled coolant systems for internal combustion engines and, more particularly, to novel means effective to block completely flow of coolant through the radiator when the thermostat is closed and without the use of complicated control elements.

The device of the invention may be installed as "OEM" equipment, that is, during the manufacture of an automotive vehicle, for example, or may be installed in an already manufactured automotive vehicle or combustion engine coolant system.

In accordance with the invention, a housing is connected in series flow relation with the radiator and particularly the lower tank of the radiator, being interposed between this lower tank and a feed line leading to the lower tank of the radiator. The housing is formed with a valve seat, and a floating body is provided within the housing to bear tightly against this valve seat except when there is flow of coolant under pressure downwardly through the radiator. A flow line leading to the internal combustion engine is connected to the housing and communicates therewith.

Preferably, the connection normally provided between the branch or short circuit flow line and the radiator is brought into the housing just mentioned, and this connection is also in communication with the circulating pump for circulating coolant through the internal combustion engine.

The floating body can be designed in accordance with the requirements of any particular installation, and external guidance or control is not required. For subsequent installation into an existing plant, the housing, including its feed line and a connection leading to the pump line, can be designed as a replaceable unit.

An object of the invention is to provide an improved coolant circulating system for internal combustion engines.

Another object of the invention is to provide, in such a coolant circulating system, a device completely blocking flow through the radiator when the thermostat is closed.

A further object of the invention is to provide such a device which effects complete shut-off of the radiator without the use of complicated control elements, to prevent access of cold coolant to the radiator.

Yet another object of the invention is ot provide such a device which can be installed in existing coolant circulating systems.

A further object of the invention is to provide such a device which comprises a housing connected in series between the lower tank of a coolant radiation and the junction of a by-pass or short circuit line to the circulating pump line, this housing containing a floating body which seats against a valve seat of the housing, except when coolant is forced downwardly through the radiator under pressure.

For an understanding of the principles of the invention, reference is made to the following description of typical embodiments thereof as illustrated in the accompanying drawings.

DESCRIPTION OF THE PREFERRED EMBODIMENTS

Figure 1:
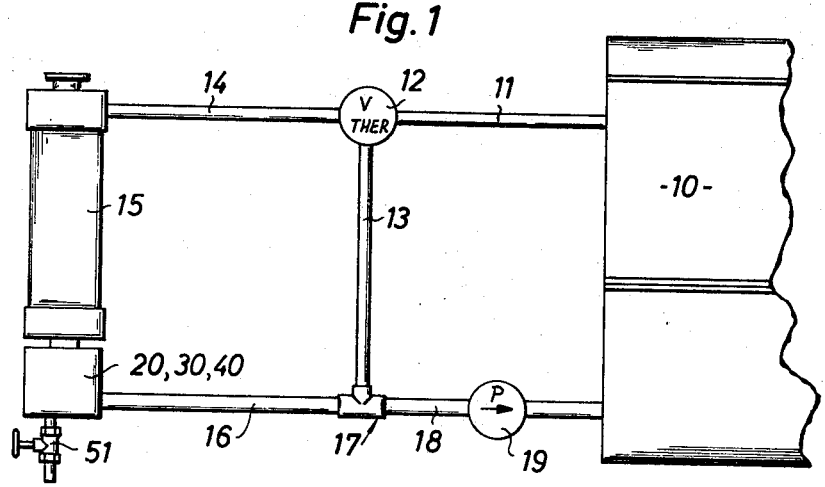
FIG. 1 is a somewhat schematic side elevation view illustrating a coolant flow circuit, for an internal combustion engine, in accordance with the invention.

Referring first to FIG. 1, which illustrates a coolant circulating system embodying the invention, the coolant for an internal combustion engine 10 is cooled in a radiator 15 when a thermostat 12 is opened. For this purpose, the coolant flows through a line 11, thermostat 12 and a line 14 to the upper tank of radiator 15, and returns to a lower line 16, a connection 17, and a line 18 to the lower portion of the internal combustion engine, the coolant being circulated by a pump 19 located in line 18. When thermostat 12 is closed, it blocks flow through line 14 to the upper tank of radiator 15, and flow then passes through a by-pass or short circuit line 13 to connection 17 so that the coolant is recirculated back to the engine through line 18 and pump 19 without flowing through radiator 15.

In accordance with the invention, a shut-off device 20, also indicated at 30 and 40 in other figures of the drawings, is connected between the lower tank of radiator 15 and the return line 16 leading to connection 17. In accordance with the invention, the thermostat 12 is designed in a known manner, but preferably has no safety opening in its valve disc, such as usually provided to insure some flow of coolant through radiator 15, although at a very low rate. Such openings in the valve disc of the thermostat counteract a rapid, effective heating of the coolant, such as water, and are unnecessary since the coolant in the circulating system is usually already provided with an anti-freeze, in the form of an already prepared coolant, for safety reasons. Consequently, the coolant in radiator 15 will not freeze in any event. While pump 19 is shown arranged directly in advance of internal combustion engine 10, it may, in accordance with known procedures, be incorporated directly in the internal combustion engine 10.

Figure 2:
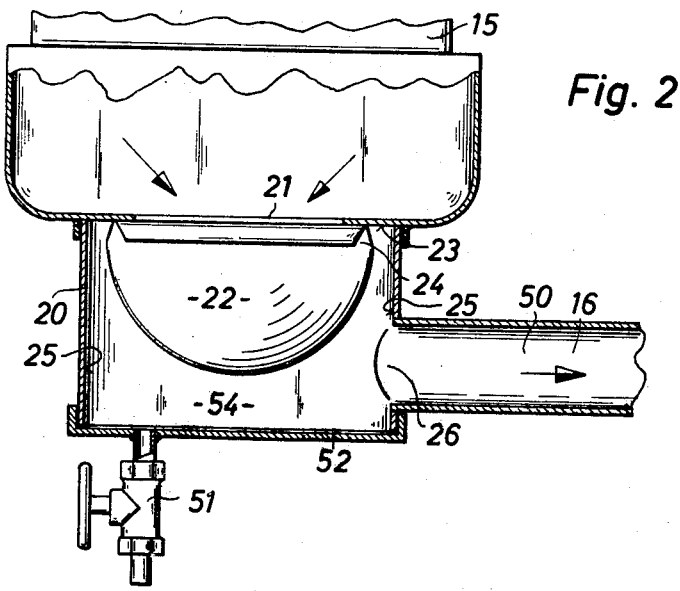
FIG. 2 is a side elevation view, partly in section, illustrating one form of radiator blocking element.

The shut-off element embodying the invention, and which has no external control device, comprises a housing 20 connected directly to the lower tank of radiator 15. At the transition zone between housing 20 and the lower tank of radiator 15, there is provided an opening 21 with a concentric valve seat 23 against which there bears a floating body 22 formed with a sealing edge 24, as best seen in FIG. 2. In the embodiment shown in FIG. 2, the floating body consists of glass and is hollow, and is in the form of a hemisphere. On the flat surface, or diametric plane of the hemisphere, there is provided an annular lug having the sealing edge 24.

The side walls 25 of housing 20 are so designed that they have a guiding relation with sealing body 22 when the latter moves downwardly under pressure prevailing inside radiator 15 when thermostat 12 is open. When thermostat 12 shuts off line 14 to radiator 15, the pressure of the coolant is exerted through line 13, T connection 17 and line 16, and serves to urge body 22 upwardly into sealing engagement with the valve seat 23 concentrically surrounding opening 21.

The line 16 may communicate laterally with housing 20 either directly, or through the interposition of a nipple or other type of pipe connection 50. The inlet cross section 26 of pipe connection 50 is so dimensioned that floating body 22 cannot be forced into connection 50 and will not block the latter with even a strong turbulent flow.

At its lower end, the housing 20 is provided with a drain cock 51 which can be arranged on a cover 52 screwed onto housing 20 and secured in any other manner with the latter. By virtue of the provision of cover 52, the insulation of body 22 is facilitated. A sump collecting in space 54 can be removed either by opening drain cock 51 or by screwing off cover 52.

Figure 3:
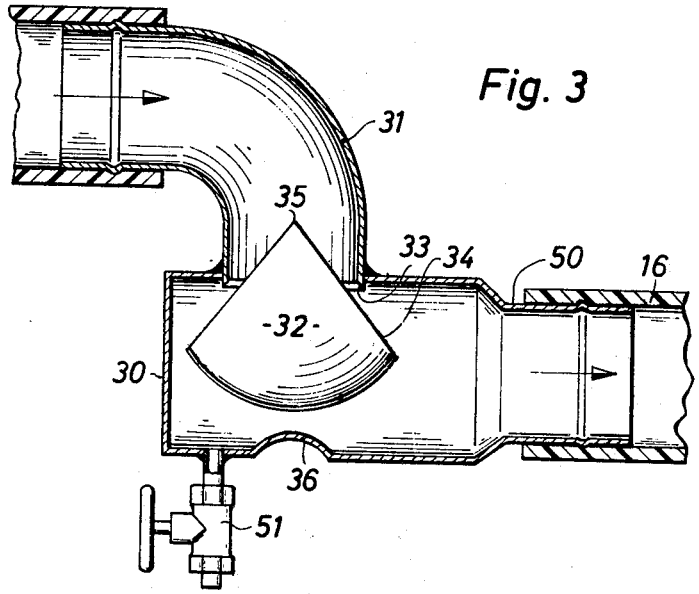
FIGS. 3 and 4 are vertical elevation views illustrating the device of the invention as constructed for installation in existing coolant circulating systems.

FIG. 3 illustrates an embodiment of the invention designed for installation in an already existing coolant circulating system. In this embodiment of the invention, housing 30 is provided with a feed line or nipple 31 by means of which it may be connected to the lower tank of a radiator, as through a suitable radiator hose. Floating body 32 is designed as a spherical sector whose conical portion 34 acts as a valve cone cooperating with a seat 33 provided at the connection of feed line 31 to housing 30. The cone apex 35 projects into line 31 and serves to guide body 32 within the housing 30. The guidance is enhanced by an internally projecting embossment or wart on the lower wall of housing 30. The housing 30 is also provided with the connection 50 which is in the form of an integral nipple which may be sealed into a radiator hose comprising the aforementioned line 16.

Figure 4:
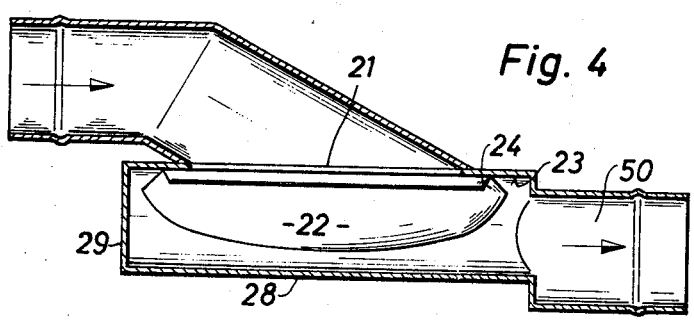

FIG. 4 also illustrates an embodiment of the invention designed for installation in existing coolant circulating systems, and having an especially flat construction. The embodiment of the invention shown in FIG. 4 includes a relatively flat housing 28 having a circular cylindrical cross section, and the cylindrical periphery 29 of housing 30 acts with a guiding relation with respect to floating body 22. In this embodiment of the invention, the floating body 22, which is preferably circular or cylindrical, is very flat and is provided with the sealing edge 24. The nipple or connection 50, in the embodiment of FIG. 4, is preferably offset somewhat downwardly. The connection to the lower tank of the radiator may be formed through a nipple 21 of relatively low height above housing 28.

Figure 5:
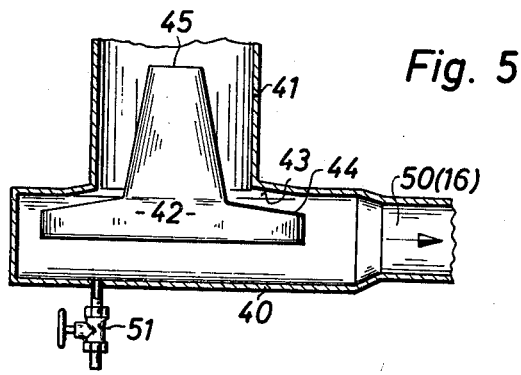
FIG. 5 is a vertical sectional view illustrating another embodiment of radiator blocking element.

In the embodiment of the invention shown in FIG. 5, there is again a relatively flat cylindrical cross section housing 40 provided with a nipple 41 which can be welded into a corresponding opening of the lower radiator tank, or which can be disengageably connected with the tank in the same manner as shown in FIGS. 3 and 4, for example. The floating body 42 is so designed that it is guided inside feed line or nipple 41 but provides, at the same time, for a rapid opening through the baffle 45, when fluid is circulated through radiator 15 under pressure when thermostat 12 is opened. The cooperating sealing surfaces 43 and 44 are so designed that they offer only a slight resistance to the flow of liquid coolant when the coolant is circulated downwardly through radiator 15.

Figure 6:
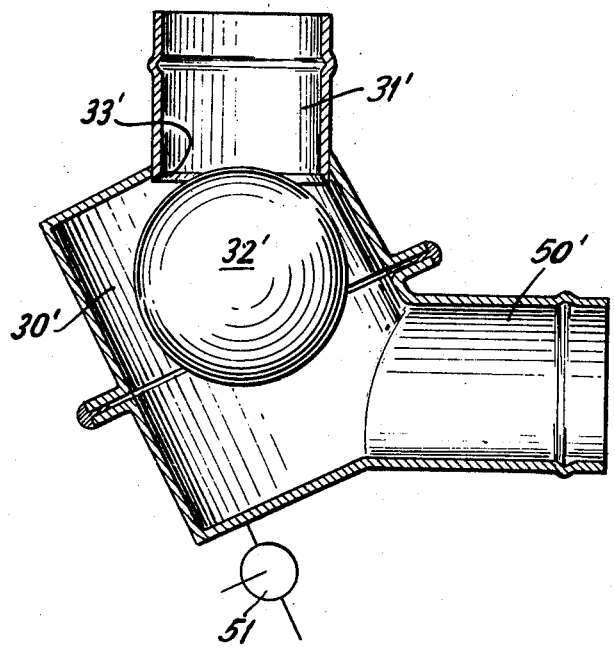
FIG. 6 is a vertical sectional view of preferred embodiment of the invention.

FIG. 6 shows a preferred embodiment of the inventive subject matter. A floatable body 32' in the form of a hollow sphere is arranged in the housing 30' in such a manner that the sphere 32' abuts against a conical seat 33' at the lower end of a feed line 31' when no overpressure from the feed line 31' is exerted on the sphere 32'. Housing 30' may be of a two-piece construction, with the two housing portions being tightly connected by means of flanges. The flanges may be connected to each other by soldering, welding, flanging, or screwing with interpolation of sealing inserts. It is also possible to have the two housing portions directly welded or soldered to each other, with the elimination of the flanges. Instead of the hollow sphere, there may also be used a solid sphere of a floatable material.

In accordance with FIG. 6, feed line 31' and outlet connection 50' are arranged at a right angle. However, the two connections may also be arranged at an angle of 180°; in this event, however, it must be assured that connection 31' is placed on a higher level than connection 50'. In this case, seat 33' is not perpendicular to the center axis of connection 31', but is inclined downwardly at an angle of about 45° relative to the center axis of connection 31'.

While the material of the floating body has been mentioned as glass, it should be understood that solid spheres of light synthetic resin plastic composition material can also be used, provided the spheres have a hard, imperforate, liquid-tight coat. Glass is particularly suitable, because of its smooth surfaces whereby no impurities can settle on the surfaces. Polished spheres of metal are also suitable for use as the floating bodies.

If the internal combustion engine is used in regions of low temperature, particularly in vehicles, it is frequently difficult, with conventional coolant circuits, to bring the engine rapidly to full power. In city buses, the full power is required only during starting, that is, for at most ten seconds. The result of this is that the thermostat constantly opens and closes, and this substantially reduces the service life of the thermostat. The present invention reduces such frequent actuation of the thermostat. Even though the device of the invention and the thermostat are not in switching connection with each other, their effects are attuned to each other, and this leads to increased power and a longer life.

The aforementioned thermosiphon effect readily occurs because of the height difference between lines 16, 18, particularly T 17, and the upper regions of radiator 15. It is considered furthermore that temperatures between 80° C. and 90° C. prevail in the range of T 17, while the temperature in the upper part of radiator 15 can be −20° C. or less, it will be clear how great a heat transfer occurs in the range of T 17 to be the basis of the thermosiphon effect. This disadvantageous heat transfer is completely avoided in accordance with the invention.

Though a few embodiments of the shut-off elements 20, 30, 40 have been illustrated, it will be clear that the arrangement is not limited to these specific embodiments. More particularly, each of the embodiments can be designed as a unit for installation in an existing coolant circulating system. Adaptation to respective construction conditions also is possible, particularly since the floating body can have various forms.

What is claimed is:

1. In a coolant circulating system for an internal combustion engine, of the type including a radiator, a coolant flow circuit, including a pump, interconnecting the engine and the radiator, a thermostat in the flow circuit controlling flow to the radiator, and a by-pass line connected to the thermostat in parallel with the radiator, a device for preventing flow of coolant in the radiator when the thermostat is closed, said device comprising, in combination, a housing connected in series with the lower end of said radiator; means forming a valve seat within said housing communicating with said radiator; a floating body in said housing sealingly engaging said valve seat when said thermostat is closed, and displaced from said valve seat upon flow of coolant under pressure through said radiator responsive to opening of said thermostat; and a line connecting said housing to said engine and included in said coolant flow circuit.

2. In a coolant circulating system for an internal combustion engine, a device as claimed in claim 1, in which said last named line extends laterally from the lower region of said housing and is connected to said pump.

3. In a coolant circulating system for an internal combustion engine, a device as claimed in claim 1, in which said floating body is a hollow sphere, and said valve seat is a conical valve seat formed at the transition between said housing and a feed line leading to said radiator.

4. In a coolant circulating system for an internal combustion engine, a device as claimed in claim 3, in which said hollow sphere is formed of glass.

5. In a coolant circulating system for an internal combustion engine, a device as claimed in claim 1, in which said valve seat is concentric with passage means communicating with said radiator and said floating body is positioned inside said housing in concentric relation with said passage; said floating body having a substantially hemispherical form with its flat surface formed with a circumferential bead configured as a sharp-edged seal for engagement with said valve seat.

6. In a coolant circulating system for an internal combustion engine, a device as claimed in claim 1, in which said housing has an opening in its upper wall and a pipe connection secured in said opening and having an edge projecting into said housing; said valve seat comprising a bevelled end of said pipe connection; said floating body being formed as a spherical sector having the apex of its conical portion extending into said pipe connection.

7. In a coolant circulating system for an internal combustion engine, a device as claimed in claim 1, in which said valve seat is provided with an insert increasing the sealing effect.

8. In a coolant circulating system for an internal combustion engine, a device as claimed in claim 1, in which said housing is designed for installation in an existing coolant circulating system, and includes a first pipe connection extending from an opening in an upper wall thereof and arranged for connection to said radiator, and a second pipe connection extending laterally from a wall thereof and arranged for connection to said line included in said coolant flow circuit.

9. In a coolant circulating system for an internal combustion engine, a device as claimed in claim 1, including a drain cock on said housing positioned lower than said line connecting said housing to said engine.

10. In a coolant circulating system for an internal combustion engine, a device as claimed in claim 1, in which said housing has a removable cover constituting its lower wall, said cover carrying a drain cock for said housing.

References Cited

UNITED STATES PATENTS

| | | | |
|---|---|---|---|
| 1,306,000 | 6/1919 | Fulton et al. | 123—41.1 |
| 1,400,925 | 12/1921 | Wolf | 123—41.1 |
| 1,558,009 | 10/1925 | Giesler | 123—41.1 |
| 1,767,598 | 6/1930 | Mallory | 123—41.1 |
| 1,938,559 | 12/1933 | Hueber | 123—41.1 XR |
| 2,067,924 | 1/1937 | Illsley | 123—41.1 |

FOREIGN PATENTS

| | | |
|---|---|---|
| 26,080 | 1905 | Great Britain. |
| 73,417 | 7/1944 | Czechoslovakia. |

WENDELL E. BURNS, Primary Examiner

U.S. Cl. X.R.

123—41.03